(12) United States Patent
Ono (10) Patent No.: US 10,404,082 B2
(45) Date of Patent: Sep. 3, 2019

(54) BATTERY PACK, CONTROL CIRCUIT, AND ELECTRONIC DEVICE

(71) Applicant: Fujitsu Client Computing Limited, Kanagawa (JP)

(72) Inventor: Katsuma Ono, Kawasaki (JP)

(73) Assignee: Fujitsu Client Computing Limited, Kanagawa (JP)

( * ) Notice: Subject to any disclaimer, the term of this patent is extended or adjusted under 35 U.S.C. 154(b) by 102 days.

(21) Appl. No.: 15/155,718

(22) Filed: May 16, 2016

(65) Prior Publication Data

US 2016/0344206 A1 Nov. 24, 2016

(30) Foreign Application Priority Data

May 20, 2015 (JP) .................................. 2015-102577

(51) Int. Cl.
*H02J 7/00* (2006.01)

(52) U.S. Cl.
CPC ........... *H02J 7/0031* (2013.01); *H02J 7/0021* (2013.01); *H02J 7/0026* (2013.01); *H02J 2007/004* (2013.01); *H02J 2007/0039* (2013.01)

(58) Field of Classification Search
CPC .. H02J 7/0026; H02J 2007/004; H02J 7/0031; H02J 7/0021
USPC ........................................................ 320/112
See application file for complete search history.

(56) References Cited

U.S. PATENT DOCUMENTS

| | | | |
|---|---|---|---|
| 6,008,629 A | 12/1999 | Saeki et al. | |
| 6,492,791 B1* | 12/2002 | Saeki | H01M 10/425 320/118 |
| 8,093,865 B2* | 1/2012 | Nishikawa | H02J 7/045 320/134 |
| 8,344,687 B2* | 1/2013 | Nishikawa | H01M 10/42 320/106 |
| 2010/0141219 A1* | 6/2010 | Li | H01M 10/441 320/162 |

(Continued)

FOREIGN PATENT DOCUMENTS

| | | |
|---|---|---|
| JP | 2000-32682 A | 1/2000 |
| JP | 2000-270485 A | 9/2000 |

(Continued)

OTHER PUBLICATIONS

Office Action dated Jan. 8, 2019, issued in counterpart Japanese Application No. 2015-102577, with English machine translation. (4 pages).

*Primary Examiner* — Drew A Dunn
*Assistant Examiner* — Tessema Kebede
(74) *Attorney, Agent, or Firm* — Osha Liang LLP (57) ABSTRACT

A battery pack including: a rechargeable battery, a protection circuit configured to disable the rechargeable battery when an output voltage value of the rechargeable battery becomes equal to or lower than a first voltage value, and a control circuit configured to stop power supply for an electronic device from the rechargeable battery when the output voltage value of the rechargeable battery becomes equal to or lower than a second voltage value that is higher than the first voltage value, the second voltage value being updated based on the output voltage value of the rechargeable battery when power supply for the electronic device from the rechargeable battery becomes unnecessary.

14 Claims, 10 Drawing Sheets

(56) References Cited

U.S. PATENT DOCUMENTS

| | | | |
|---|---|---|---|
| 2011/0205678 A1* | 8/2011 | Baba | H02J 7/0031 361/86 |
| 2014/0347015 A1 | 11/2014 | Shih et al. | |
| 2015/0188326 A1* | 7/2015 | Choi | H02J 7/0029 320/112 |

FOREIGN PATENT DOCUMENTS

| | | |
|---|---|---|
| JP | 2007-520180 A | 7/2007 |
| JP | 2009-17648 A | 1/2009 |
| JP | 2009-89468 A | 4/2009 |
| JP | 2010-124629 A | 6/2010 |
| JP | 2010-191880 A | 9/2010 |
| JP | 2011-115012 A | 6/2011 |
| JP | 2011-172475 A | 9/2011 |
| JP | 2011-176940 A | 9/2011 |

* cited by examiner

| SHUTDOWN VOLTAGE Voff | IDLE-MODE DURATION | SHUTDOWN-MODE START VOLTAGE Vsd (DISCHARGE CAPACITY %) | IDLE-MODE DURATION AFTER CHANGE |
|---|---|---|---|
| 4.20V | 128 DAYS | 3.80V (28%) | 101 DAYS |
| 4.10V | 124 DAYS | 3.75V (23%) | 104 DAYS |
| 4.00V | 119 DAYS | 3.72V (20%) | 103 DAYS |
| 3.90V | 112 DAYS | 3.70V (16%) | 102 DAYS |
| 3.80V | 36 DAYS | 3.65V (14%) | 30 DAYS |
| 3.70V | 20 DAYS | 3.60V (13%) | 14 DAYS |

FIG. 7

BATTERY LIFE AFTER CHANGING Vodp IN EMBODIMENT

FIG. 9

| SHUTDOWN VOLTAGE Voff | SHUTDOWN-MODE START VOLTAGE Vsd | OVER-DISCHARGE-PROTECTION-MODE START VOLTAGE Vodp | DEEP-DISCHARGE-MODE START VOLTAGE Vsuv |
|---|---|---|---|
| >Vn | Vsdn | Vodpn | Vsuv |
| <Vn,>Vn-1 | Vsdn-1 | Vodpn-1 | Vsuv |
| ⋮ | ⋮ | ⋮ | ⋮ |
| <V2,>V1 | Vsd2 | Vodp2 | Vsuv |
| <Vn,>Vn-1 | Vsd1 | Vodp1 | Vsuv |

FIG. 10

BATTERY PACK, CONTROL CIRCUIT, AND ELECTRONIC DEVICE

CROSS-REFERENCE TO RELATED APPLICATION

This application is based upon and claims the benefit of priority of the prior Japanese Patent Application No. 2015-102577, filed on May 20, 2015, the entire contents of which are incorporated herein by reference.

FIELD

The embodiment discussed herein is related to a buttery pack, a control circuit, and an electronic device.

BACKGROUND

The use of electronic devices such as mobile phones, notebook personal computers, and mobile game machines has spread in recent years, and lithium ion rechargeable batteries have been widely used as power sources for such devices.

When the battery voltage of a lithium ion rechargeable battery reaches a deep discharge region (for example, equal to or less than about 1.0 V), deposition of metallic lithium may cause an internal short-circuit. Charging the rechargeable battery in such a condition may lead to ignition or rupture of the rechargeable battery. Accordingly, to enhance safety, a battery pack has been equipped with a protection circuit in many cases in recent years, with the protection circuit having a function of prohibiting charging in the deep discharge state.

However, if the charge prohibition function is active, subsequent charging and discharging may no longer be performed (namely, the battery pack including the rechargeable battery is disabled). A state where the charge prohibition function is active may lead to complaints from users. Hence, to date, measures have been taken to prolong the time for a battery voltage to reach the deep discharge region, with such measures including a mode in which circuits in the battery pack are caused to sleep and a mode in which when the battery voltage becomes equal to or lower than a predetermined voltage, current consumed by the circuits in the battery pack is reduced in an over discharge region (Japanese Laid-open Patent Publication No. 2011-115012).

Such a related art reduces the current consumed after the voltage reaches the over discharge region and thus enables prolongation of the period for the voltage to reach the deep discharge region through the over discharge region and prolongation of a battery pack storable period.

The following documents are other examples of the related art: Japanese Laid-open Patent Publication No. 2010-124629; Japanese Laid-open Patent Publication No. 2000-32682; and Japanese Laid-open Patent Publication No. 2000-270485.

SUMMARY

According to an aspect of the invention, a battery pack includes a rechargeable battery, a protection circuit configured to disable the rechargeable battery when an output voltage value of the rechargeable battery becomes equal to or lower than a first voltage value, and a control circuit configured to stop power supply for an electronic device from the rechargeable battery when the output voltage value of the rechargeable battery becomes equal to or lower than a second voltage value that is higher than the first voltage value, the second voltage value being updated based on the output voltage value of the rechargeable battery when power supply for the electronic device from the rechargeable battery becomes unnecessary.

The object and advantages of the invention will be realized and attained by means of the elements and combinations particularly pointed out in the claims;

It is to be understood that both the foregoing general description and the following detailed description are exemplary and explanatory and are not restrictive of the invention, as claimed.

DESCRIPTION OF EMBODIMENT

In the related art, consumed current is reduced when the battery voltage becomes equal to or lower than the predetermined voltage. In this case, setting a start voltage for reducing the consumed current to a high value enables prolongation of the period for the battery voltage to reach a deep discharge region.

However, this leads to usage restrictions, regardless of the usage by a user, for example, the period of time in which a user may use an electronic device after switching on the electronic device is reduced.

The embodiment provides a rechargeable battery and a control circuit that enable the period for the battery voltage to reach the deep discharge region to be prolonged in accordance with the usage by a user.

An embodiment will be described.

An electronic device connected to a battery pack including a rechargeable battery according to the embodiment has the following configuration so as to avoid hazards such as an internal short-circuit caused by deposition of metallic lithium. Specifically, when the voltage value of the rechargeable battery reaches a voltage value Vsuv at which the voltage value reaches the deep discharge region, charging is prohibited, and the battery pack is may not be used. Precautionary measures are taken in such a manner that discharge from the rechargeable battery is suppressed as much as possible before the voltage value reaches the deep discharge region.

As such precautionary measures, the battery pack has two modes, which are a shutdown mode and an over-discharge-protection mode.

In the shutdown mode, when the voltage value of the rechargeable battery is decreased to a predetermined voltage value Vsd that is much higher than the voltage value Vsuv, charging of the rechargeable battery is started, and power supply from the rechargeable battery to an electronic device or another device is restricted. When the battery pack enters the shutdown mode, some internal circuits of the battery pack are caused to sleep (shift to a power saving mode), and power consumption is minimized.

In the over-discharge-protection mode, when the voltage value of the rechargeable battery is decreased to a predetermined voltage value Vodp that is lower than the voltage value Vsd of the rechargeable battery for the shutdown mode and that is higher than the voltage value Vsuv for the deep discharge region, the internal circuits of the battery pack are suppressed to such an extent that current consumed due to self-discharge inside the battery pack is reduced to substantially zero, and power consumption of the rechargeable battery is thus reduced to substantially zero. When the battery pack enters the over-discharge-protection mode, the internal circuits of the battery pack are substantially stopped, and quick charging or other operations are thus restrained.

To date, the voltage value Vsd of the rechargeable battery for shifting to the shutdown mode and the voltage value Vodp of the rechargeable battery for shifting to the over-discharge-protection mode have been respectively set in advance to fixed values.

In the embodiment, the voltage value Vsd, or both the voltage values Vsd and Vodp, are dynamically changed (or updated) based on the voltage value of the rechargeable battery observed when power supply from the rechargeable battery (the battery pack) is terminated (when the electronic device equipped with the battery pack is switched off, or when power supply for the electronic device from the rechargeable battery becomes unnecessary). The period for the rechargeable battery to reach the deep discharge region is thereby maximized.

Specifically, in the embodiment, if the voltage value of the rechargeable battery is high when the power supply from the battery pack is terminated, the voltage value Vsd of the rechargeable battery for shifting to the shutdown mode is set higher than a usually set voltage value. This substantially prolongs the period to a deep-discharge mode. Shifting to the shutdown mode means that the power supply from the battery pack is restrained unless the battery pack is charged. The shifting means that, for example, the electronic device equipped with the battery pack may not be started. However, this may not inconvenience the user so much for the following reason. A high voltage of the rechargeable battery observed when the power supply from the battery pack is terminated indicates that the rechargeable battery has a sufficiently large capacity. Even though the high voltage value Vsd of the rechargeable battery for shifting to the shutdown mode is set, a sufficiently long period is ensured before starting of the electronic device is not allowed.

Likewise, the voltage value Vodp of the rechargeable battery for shifting to the over-discharge-protection mode is set higher than a usually set voltage value, and the period to the deep-discharge mode is thereby further prolonged.

If the electric device is switched on and starts to receive power supply from the battery pack before entering the shutdown mode, the voltage values for shifting the respective modes described above are respectively reset to the predetermined usually set voltage values. In contrast, if charging is started and thereafter terminated, the method according to the embodiment based on the voltage value of the rechargeable battery at the time of terminating charging may be used, except that power is being supplied to the electronic device.

Hereinafter, the embodiment will be described in detail with reference to the attached drawings. An electronic device including a rechargeable battery in the following description includes an electronic device including a rechargeable battery such as a mobile phone, a notebook personal computer, or a mobile game machine.

Figure 1:
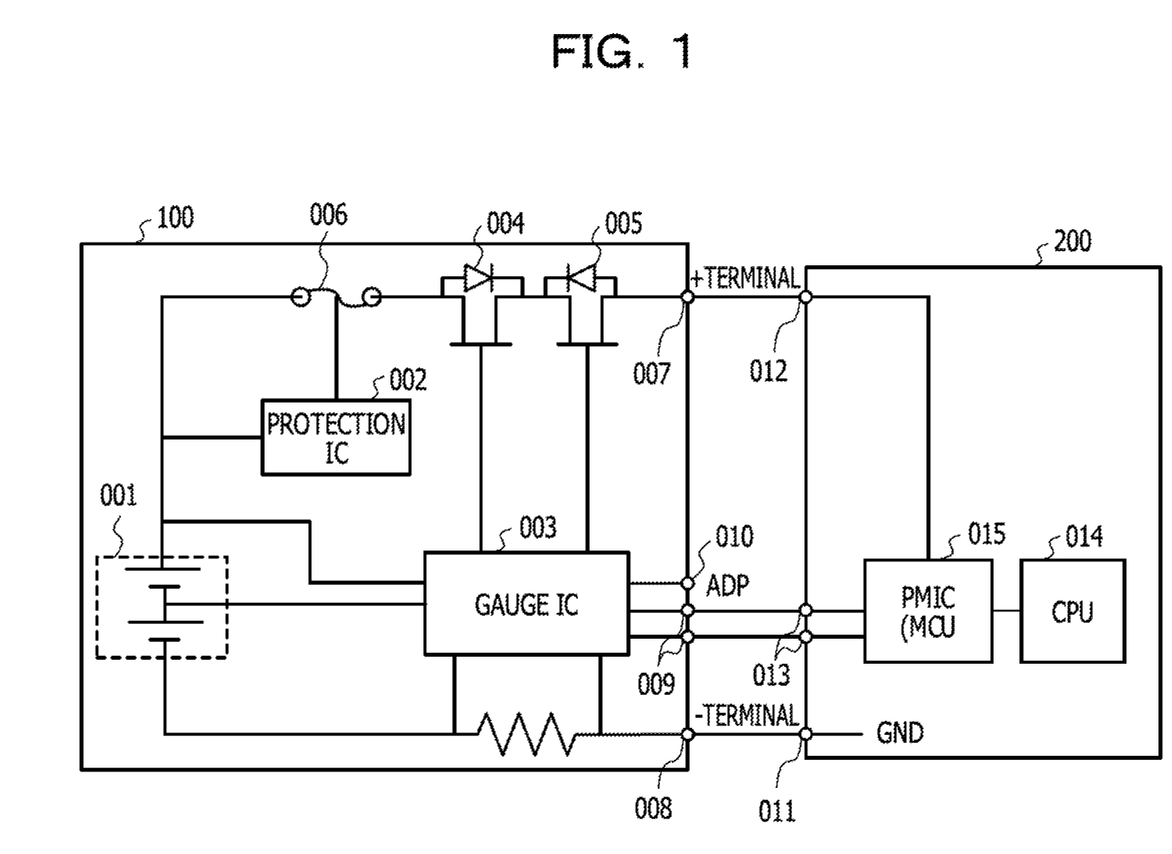
FIG. 1 illustrates an example hardware configuration of a battery pack and an electronic device.

FIG. 1 illustrates an example hardware configuration of a battery pack 100 and an electronic device 200.

The battery pack 100 is connected to the electronic device 200 and supplies current to thereby cause the electronic device 200 to operate. The battery pack 100 is incorporated into or detachably provided to the electronic device 200.

The battery pack 100 includes a rechargeable battery 001, a protection integrated circuit (IC) 002, a gauge IC 003, a charge control field effect transistor (FET) 004, a discharge control FET 005, and a fuse 006. The battery pack 100 also includes a positive terminal 007, a negative terminal 008, data communication terminals 009, and an adaptor power input terminal (ADP) 010. Power is supplied from an adaptor to the adaptor power input terminal 010, and charging is performed.

The positive terminal 007 and the negative terminal 008 of the battery pack 100 are respectively connected to a positive terminal 011 and a negative terminal 012 of the electronic device 200, and discharging is performed. The data communication terminals 009 of the battery pack 100 are connected to data communication terminals 013 of the electronic device 200, and data communication is performed.

The rechargeable battery 001 includes one or a plurality of serial- or parallel-connected rechargeable batteries. For example, a lithium ion rechargeable battery is usable as the rechargeable battery. In the illustrated example, two rechargeable batteries are used.

The protection IC 002 cuts off over discharge current or over charge current by using the fuse 006 when the discharge current or the charge current becomes equal to or higher than a predetermined value. This hinders deterioration of the rechargeable battery 001 and ensures a long life.

The gauge IC 003 is a semiconductor IC that implements various functions (described later) by using programs. The gauge IC 003 measures or calculates the remaining capacity of the rechargeable battery 001, detects a voltage input from the adaptor power input terminal 010, controls the charge control FET 004 and the discharge control FET 005, and switches between a plurality of modes related to protection of the rechargeable battery 001.

An idle mode, the shutdown mode, the over-discharge-protection mode, and a deep-discharge mode are provided as examples of the plurality of modes related to protection of the rechargeable battery 001. The idle mode is a mode in which the user is allowed to start the electronic device 200. In the idle mode, discharging to the electronic device 200, charging the battery pack 100 with the adaptor connected thereto, and discharging in the internal circuits of the battery pack 100 are performed as usual.

The shutdown mode is a mode in which the consumed current is reduced with minimum functions being enabled. In the shutdown mode, the battery pack 100 causes the gauge IC 003 to sleep, turns on the charge control FET 004 and the discharge control FET 005, and charging of the battery pack 100 with the adapter connected is performed in accordance with the usually used setting. Consumed current is thereby reduced in comparison with the idle mode.

The over-discharge-protection mode is a mode in which discharging of the rechargeable battery 001 is prohibited. In the over-discharge-protection mode, the battery pack 100 turns off the gauge IC 003 and thus turns off the charge control FET 004 and the discharge control FET 005. The over-discharge-protection mode is a mode in which consumed current is reduced in comparison with the shutdown mode.

The deep-discharge mode is a mode in which the protection IC 002 cuts off current to the fuse 006 to prohibit charging and discharging, and the electronic device 200 is thus not allowed to be started or charged.

The charge control FET 004 and the discharge control FET 005 are turned on or off in accordance with the mode under the control of the gauge IC 003.

When current having a predetermined value or higher flows through the fuse 006, the fuse 006 fuses to cut off the current flow. In such cases where a cutoff function against excessive current to be implemented by the protection IC 002 does not work properly and where the cutoff function against excessive current does not work properly due to a failure such as a short-circuit of the charge control FET 004 or the discharge control FET 005, the fuse 006 fuses in this manner, and double protection is thus performed.

The electronic device 200 includes a central processing unit (CPU) 014 and a power management integrated circuit (PMIC) 015. When the CPU 014 runs a predetermined program, the electronic device 200 accordingly implements the function of the electronic device 200. When the PMIC 015 runs a predetermined program, the electronic device 200 accordingly performs communication with and control of the battery pack 100.

Figure 2:
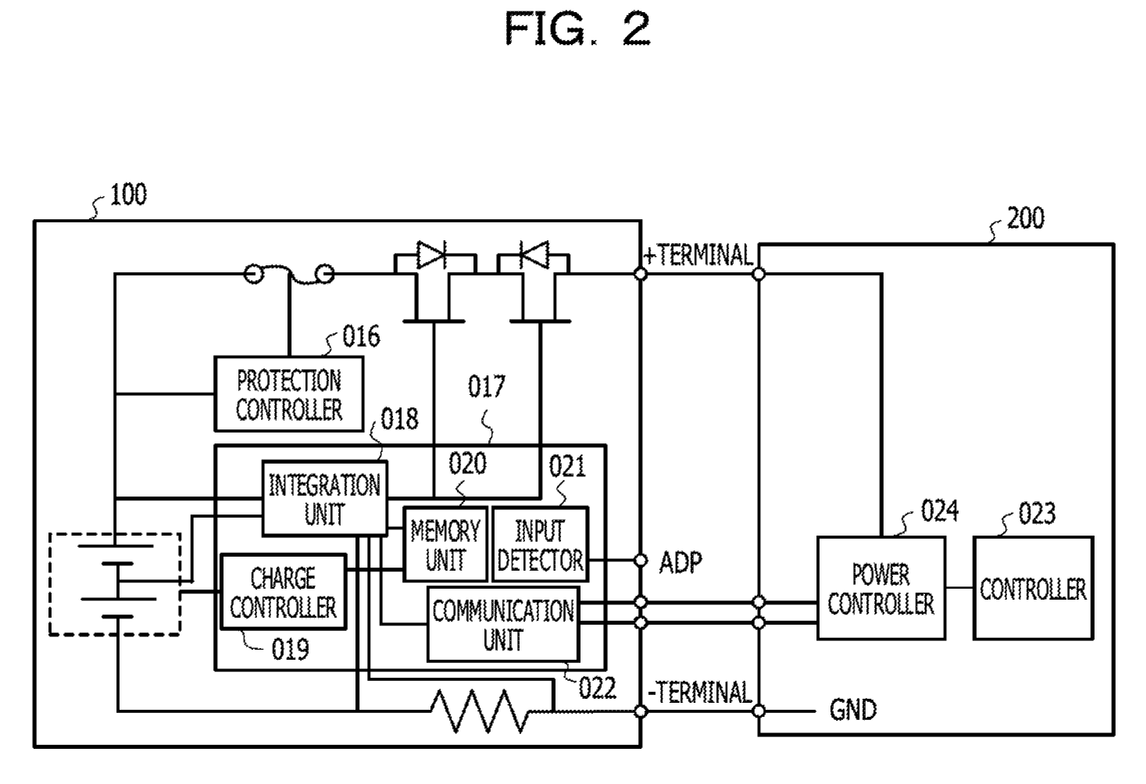
FIG. 2 illustrates an example functional configuration of the battery pack and the electronic device.

FIG. 2 illustrates an example functional configuration of the battery pack 100 and the electronic device 200.

The battery pack 100 has functions of a protection controller 016 and a power controller 017.

The power controller 017 has functions of an integration unit 018, a charge controller 019, a memory unit 020, an input detector 021, and a communication unit 022. Each function is implemented by running a corresponding one of programs stored in the memory unit 020 of the gauge IC 003 or by the internal circuits of the battery pack 100.

The integration unit 018 measures a battery voltage of the rechargeable battery 001 at regular intervals and switches the modes related to protection of the rechargeable battery 001 based on a measurement result by using a set threshold.

The charge controller 019 controls charging and discharging by controlling the charge control FET 004 and the discharge control FET 005. The input detector 021 detects power supply to the adaptor power input terminal 010 from the adaptor.

The communication unit 022 communicates with the electronic device 200 connected to the data communication terminals 009.

The electronic device 200 has functions of a controller 023 and a power controller 024. The electronic device 200 implements the functions of the electronic device 200 by using the controller 023. When the PMIC 015 runs a predetermined program, the power controller 024 of the electronic device 200 performs communication with and control of the battery pack 100.

Functions of changing modes related to protection of the rechargeable battery 001 will be described later.

The plurality of modes related to protection of the rechargeable battery 001 provided to the electronic device 200 will be described.

Figure 3:
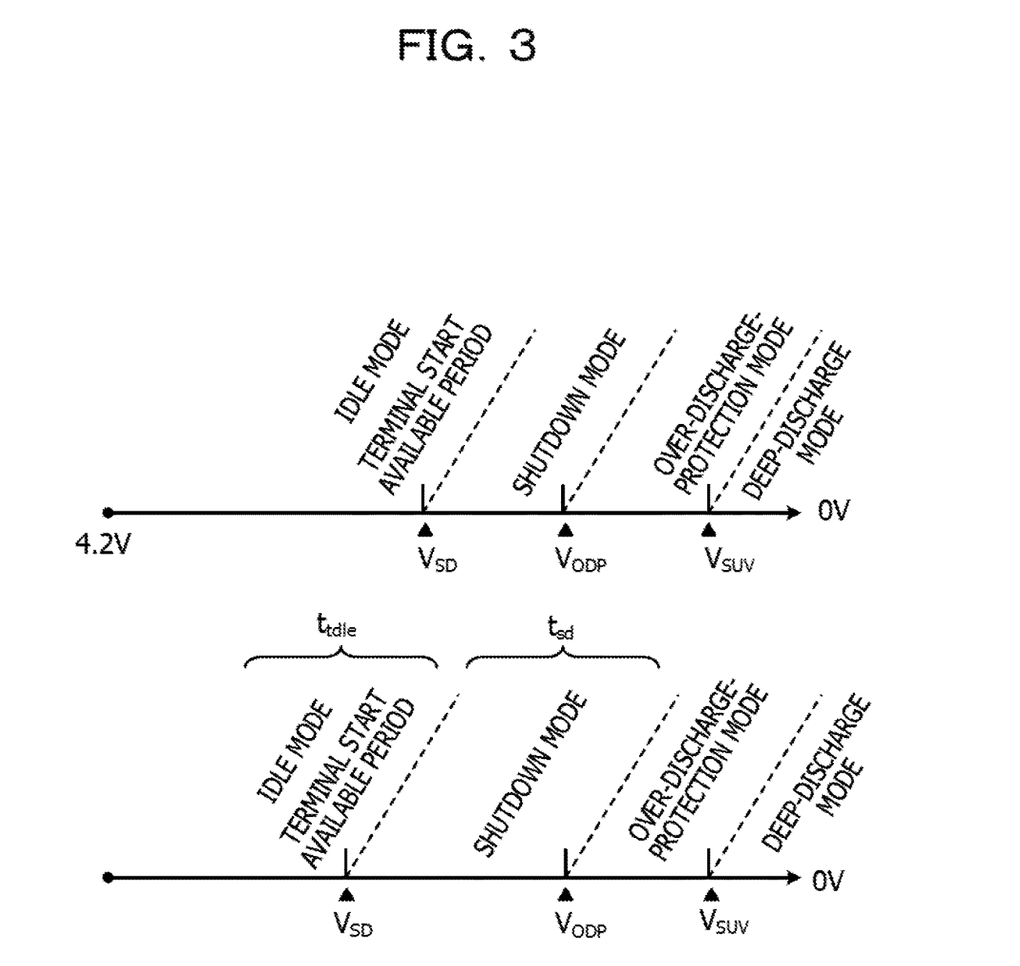
FIG. 3 illustrates example modes related to protection of a rechargeable battery.

FIG. 3 illustrates example modes related to protection of the rechargeable battery 001.

The idle mode, the shutdown mode, the over-discharge-protection mode, and the deep-discharge mode will be described as examples of the plurality of modes related to protection of the rechargeable battery 001. The idle mode is a mode in which the user is allowed to start the electronic device 200. In the idle mode, discharging to the electronic device 200, charging the battery pack 100 with the adaptor connected thereto, and discharging in the internal circuits of the battery pack 100 are performed as usual. The idle mode operates while the voltage value detected in the rechargeable battery 001 is higher than the voltage value Vsd (V). When the voltage value detected in the rechargeable battery 001 becomes equal to or lower than the shutdown-mode start voltage value Vsd (V), the mode of the battery pack 100 is switched to the shutdown mode.

In the shutdown mode, the battery pack 100 causes the gauge IC 003 to sleep, turns on the charge control FET 004 and the discharge control FET 005, and charging of the battery pack 100 with the adapter connected is performed in accordance with the usually used setting. The value of a voltage that is detected in the rechargeable battery 001 and that causes the shutdown mode ranges from the voltage value Vsd (V) to a voltage value higher than the over-discharge-protection-mode start voltage value Vodp (V).

The over-discharge-protection mode is a mode in which discharging of the rechargeable battery 001 is prohibited. In the over-discharge-protection mode, the battery pack 100 turns off the gauge IC 003 and thus turns off the charge control FET 004 and the discharge control FET 005. The over-discharge-protection mode is a mode in which consumed current is reduced in comparison with the shutdown mode. A voltage value leading to the over-discharge-protection mode ranges from the voltage value Vodp (V) to a voltage value higher than the voltage value Vsuv (V) that is a deep-discharge-mode start voltage value.

The deep-discharge mode is a mode in which the protection IC 002 cuts off current to the fuse 006 to prohibit charging and discharging, and the electronic device 200 is thus not allowed to be started or charged. A voltage value leading to the deep-discharge mode is equal to or lower than the voltage value Vsuv (V) that is the deep-discharge-mode start voltage value.

In the embodiment, the voltage values Vsd and Vodp are set based on the voltage value of the rechargeable battery 001 detected when the electronic device 200 is switched off and based on the discharge characteristic of the rechargeable battery 001.

A method for setting a voltage value for changing a mode related to control of a rechargeable battery will be described by using FIGS. 4 to 7.

Figure 4:
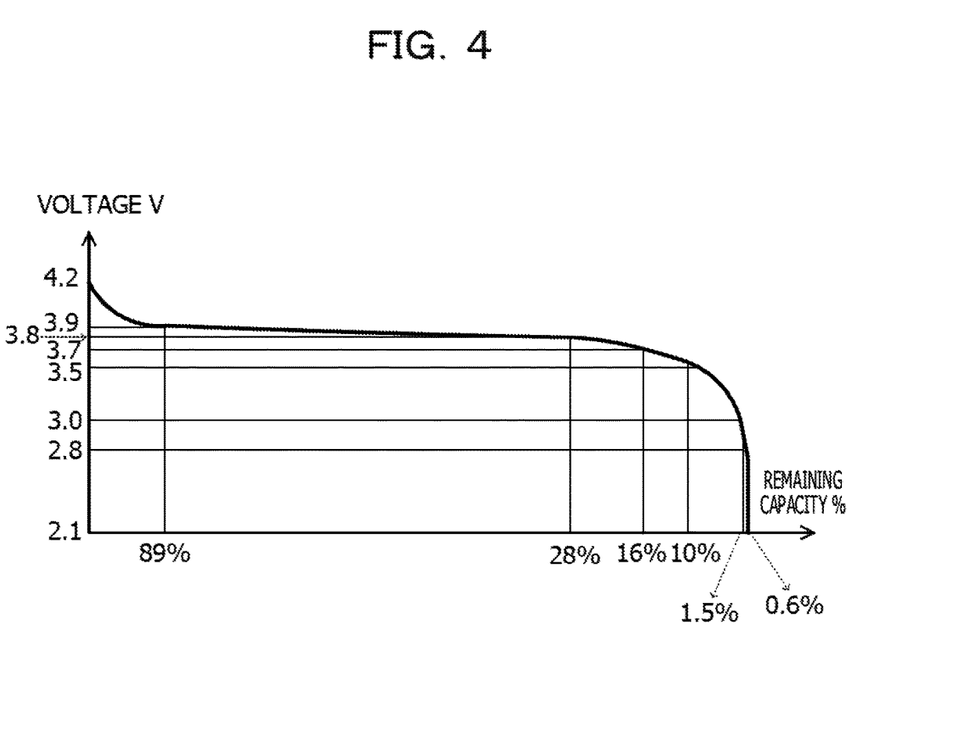
FIG. 4 illustrates an example discharge characteristic of the rechargeable battery.

FIG. 4 illustrates an example discharge characteristic of the rechargeable battery 001.

FIG. 4 illustrates, as the example, a discharge characteristic of the rechargeable battery 001 having a battery capacity of 6760 mAh and a rated voltage of 4.2 V. The vertical axis of the graph represents a voltage value of the rechargeable battery 001, and the horizontal axis represents a remaining capacity. Consider a case where the idle mode operates with a voltage value of the rechargeable battery 001 being between 3.9 V and 3.5 V, the shutdown-mode start voltage value Vsd is 3.5 V, and the over-discharge-protection-mode start voltage value Vodp is 2.8 V. In this case, the 89% remaining capacity corresponds to a capacity of approximately 5400 mAh available in the idle mode, and the 10% remaining capacity corresponds to a capacity of approximately 600 mAh available in the shutdown mode. Consumed current in the idle mode is 2 mA, and consumed current in the shutdown mode is 0.2 mA. The discharge characteristic may be used to calculate the period to the deep-discharge mode.

Figure 5:
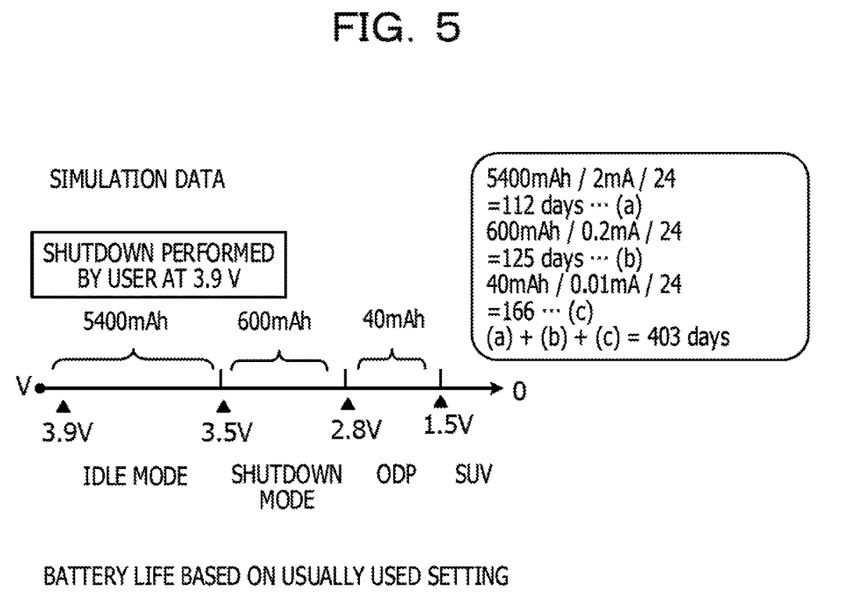
FIG. 5 illustrates examples of voltage values for changing modes related to protection of the rechargeable battery and calculation of period to a deep-discharge mode.

FIG. 5 illustrates examples of voltage values for changing modes related to protection of the rechargeable battery 001 and calculation of the period to the deep-discharge mode.

As illustrated in FIG. 5, in a case where the user shuts down the electronic device 200 at a voltage of 3.9 V, calculating the period of the idle mode (namely, the period during which the voltage keeps higher than 3.5V) reveals 112 days (a) based on the capacity of 5400 mAh available in the idle mode and the consumed current of 2 mA in the idle mode.

The period of the shutdown mode (namely, the period during which the voltage keeps higher than 2.8V) is 125 days (b) based on the capacity of 600 mAh available in the shutdown mode and the consumed current of 0.2 mA in the shutdown mode. The period of the over-discharge-protection mode (namely, the period during which the voltage keeps higher than 1.5V) is 166 days (c) based on a capacity of 40 mAh available in the over-discharge-protection mode and a consumed current of 0.01 mA in the over-discharge-protection mode. This leads to the calculation, of the period to the deep-discharge mode, based on a voltage value Voff at which the user shuts down the electronic device 200, the calculation revealing that (a)+(b)+(c)=403 days. In the embodiment, the voltage value Voff at which the user shuts down the electronic device 200 is used to set the shutdown-mode start voltage value Vsd and the over-discharge-protection-mode start voltage value Vodp in consideration of a period in which the user is allowed to use the electronic device 200, that is, the period of the idle mode. The modes are switched between each other by using these values.

Figure 6:
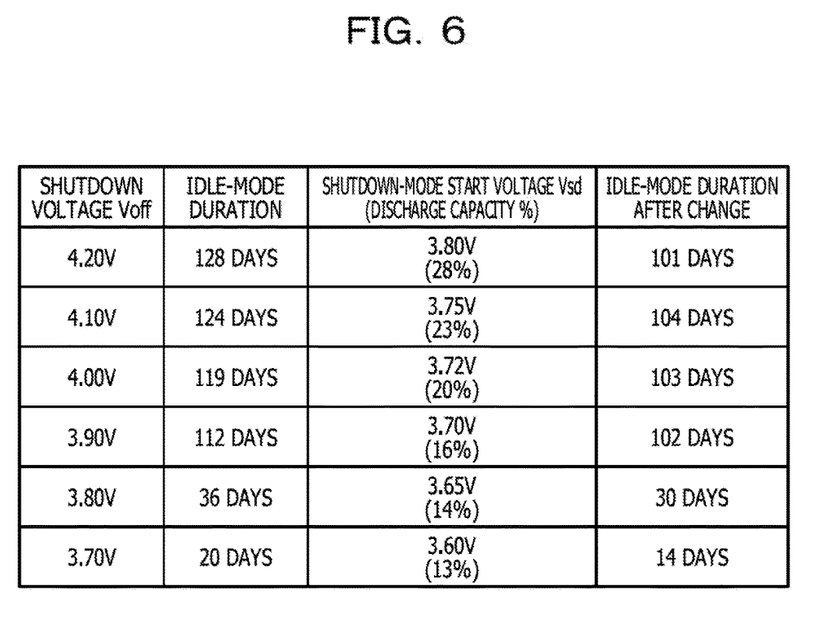
FIG. 6 illustrates relationships between the initial value of a voltage value for changing the mode related to protection of the rechargeable battery and a shutdown-mode start voltage value after the change of the voltage value performed based on the voltage value at the time of shutdown.

FIG. 6 illustrates relationships between the initial value of a voltage value for changing the mode related to protection of the rechargeable battery 001 and a shutdown-mode start voltage value after the change (or the update) of the voltage value performed based on the voltage value at the time of shutdown.

In the embodiment, the duration of the idle mode is focused on. The idle-mode duration is set in advance to X days, which is approximately 100 days. The shutdown-mode start voltage value Vsd is calculated to satisfy the idle-mode duration based on the voltage value Voff of the rechargeable battery 001 at which the user shuts down the electronic device 200. For example, if the voltage value Voff of the rechargeable battery 001 at which the user shuts down the electronic device 200 is 3.9 V, the shutdown-mode start voltage value Vsd set to 3.5 V as the initial value is set to 3.7 V. In this case, the idle-mode duration is decreased from 112 days to 102 days, the period to the deep-discharge mode is prolonged in comparison with the 403 days illustrated in FIG. 5. It is conceivable that although the idle-mode duration is decreased, advance examination of usage by the user and setting of the optimum duration X may minimize inconvenience for the user, may hinder reaching the deep-discharge mode, which suppresses starting and charging of the electronic device 200, and may thus reduce complaints by users.

Figure 7:
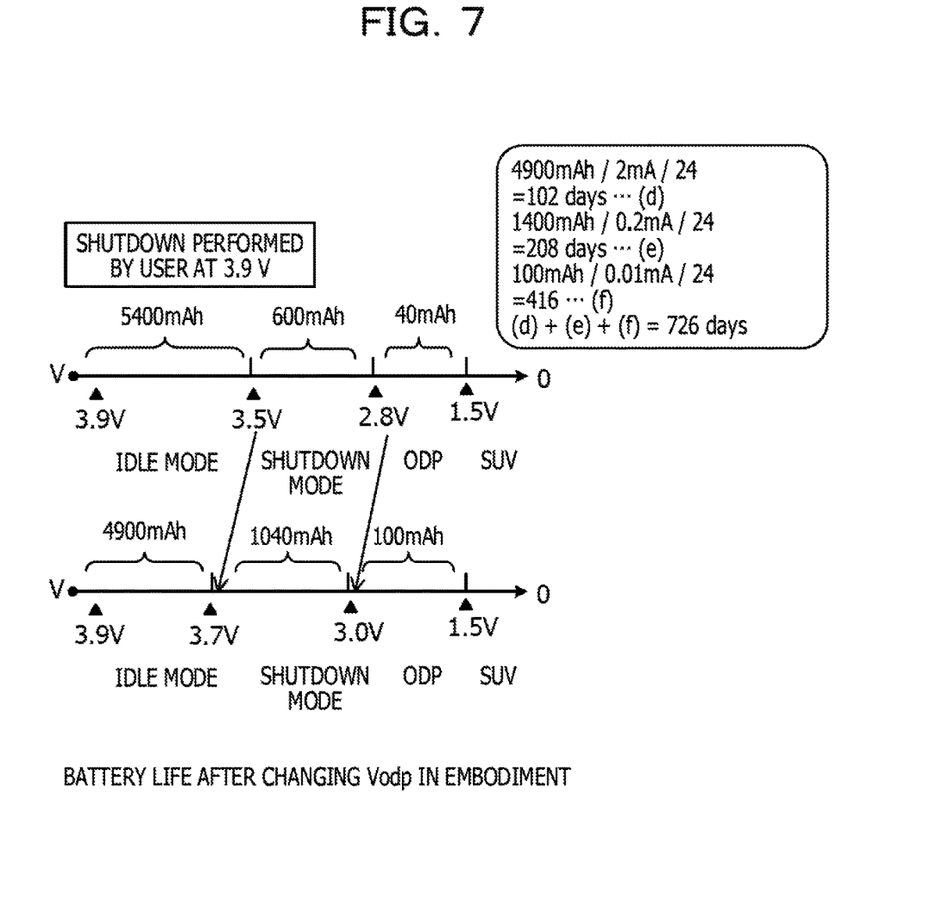
FIG. 7 illustrates an example in which the shutdown-mode start voltage value and an over-discharge-protection-mode voltage value are changed based on the voltage value at the time of the shutdown of the electronic device.

FIG. 7 illustrates an example in which the shutdown-mode start voltage value Vsd and the over-discharge-protection-mode voltage value Vodp are changed based on the voltage value Voff at the time of the shutdown of the electronic device 200. Consider a case where the voltage value Voff of the rechargeable battery 001 at which the user shuts down the electronic device 200 is 3.9 V. The shutdown-mode start voltage value Vsd of 3.7 V and the over-discharge-protection-mode start voltage value Vodp of 3.0 V reveal that (d)+(e)+(f)=726 days. This results in a considerable increase from the 403 days previously calculated.

Hereinafter, a flow of changing the mode will be described by using FIGS. 8 to 10.

In the embodiment, an example in which both the shutdown-mode start voltage value Vsd and the over-discharge-protection-mode start voltage value Vodp are dynamically changed is provided. The voltage values are dynamically changed based on the voltage value of the rechargeable battery observed when power supply from the rechargeable battery (the battery pack) is terminated (when the electronic device equipped with the battery pack is switched off). When the embodiment is implemented, at least the shutdown-mode start voltage value Vsd may be dynamically changed based on the voltage value of the rechargeable battery observed when power supply from the rechargeable battery is terminated, and the over-discharge-protection-mode start voltage value Vodp may be set to a fixed value.

Figure 8:
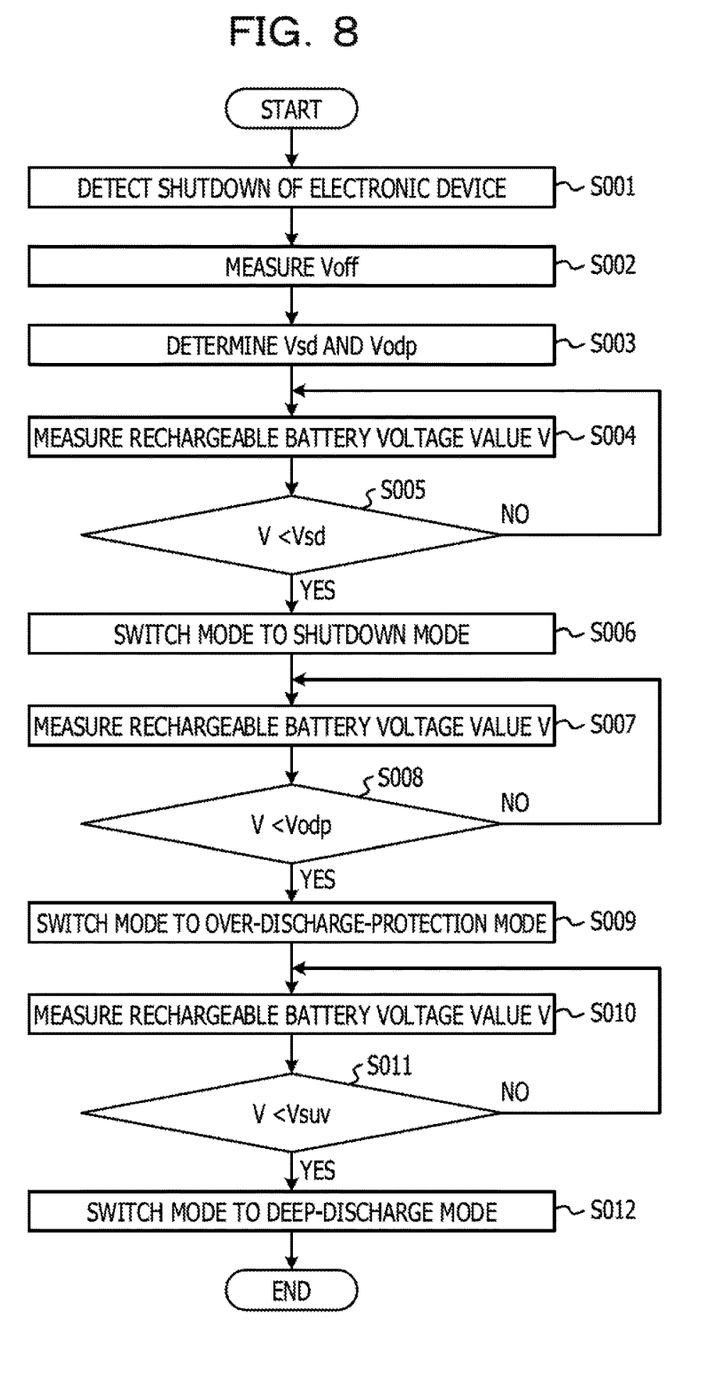
FIG. 8 illustrates a flow of changing start voltage values for the respective modes.
Figure 9:
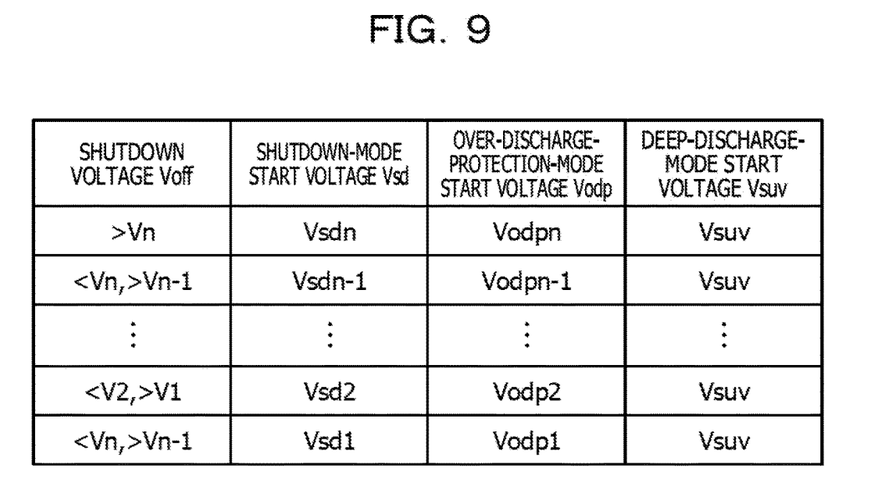
FIG. 9 illustrates a table of set values of the start voltage values for the respective modes.

FIG. 8 illustrates a flow of changing start voltage values for the respective modes.

The communication unit 022 of the battery pack 100 receives a notification indicating the shutdown, that is, switching off of the electronic device 200 from the power controller 017 of the electronic device 200 and thus detects the shutdown of the electronic device 200 (S001). When detecting the shutdown of the electronic device 200, the battery pack 100 causes the integration unit 018 to measure the voltage value Voff of the rechargeable battery 001 (S002). The integration unit 018 of the battery pack 100 determines the shutdown-mode start voltage value Vsd and the over-discharge-protection-mode start voltage value Vodp (S003). The shutdown-mode start voltage value Vsd and the over-discharge-protection-mode start voltage value Vodp are determined by using the table illustrated in FIG. 9, the table having start voltage values set for the respective modes.

How the shutdown-mode start voltage value Vsd and the over-discharge-protection-mode start voltage value Vodp are determined when the shutdown of the electronic device 200 is detected will be described by using FIG. 9. FIG. 9 illustrates a table having the start voltage values set for the respective modes. The table in FIG. 9 lists the shutdown-mode start voltage values Vsd and the over-discharge-protection-mode voltage values Vodps that are provided for the shutdown voltage values Voff.

When a shutdown voltage value Voff is equal to or lower than Vn and is higher than Vn−1, the shutdown-mode start voltage value Vsd is Vsdn−1, and the over-discharge-protection-mode start voltage value Vodp is Vodpn−1. The deep-discharge-mode start voltage value Vsuv is fixed for the shutdown voltage values Voff. For example, when the shutdown voltage value Voff is 3.9 V, the shutdown-mode start voltage value Vsd is 3.7 V, and the over-discharge-protection-mode start voltage value Vodp is 3.0 V.

In one of conceivable ways of setting the shutdown-mode start voltage value Vsd and the over-discharge-protection-mode start voltage value Vodp in advance, the duration of the idle mode is focused on. The idle-mode duration is set to X days in advance, and the shutdown-mode start voltage value Vsd is calculated to satisfy the idle-mode duration based on the voltage value Voff of the rechargeable battery 001 at which the user shuts down the electronic device 200. For example, if the voltage value Voff of the rechargeable battery 001 at which the user shuts down the electronic device 200 is 3.9 V, the shutdown-mode start voltage value Vsd set to 3.5 V as the initial value is set to 3.7 V. In this case, the idle-mode duration is decreased from 112 days to 102 days, the period to the deep-discharge mode is prolonged in comparison with the 403 days illustrated in FIG. 5. It is conceivable that although the idle-mode duration is decreased, advance examination of usage by the user and setting of the optimum duration X may minimize inconvenience for the user, may hinder reaching the deep-discharge mode, which suppresses starting and charging of the electronic device 200, and may thus reduce complaints by users.

After the shutdown-mode start voltage value Vsd and the over-discharge-protection-mode start voltage value Vodp are determined in step S003, the integration unit 018 of the battery pack 100 measures a battery voltage value V of the rechargeable battery 001 so as to determine whether the battery voltage value V has reached the shutdown-mode start voltage value Vsd (S004). The integration unit 018 of the battery pack 100 determines whether the measured battery voltage value V of the rechargeable battery 001 is equal to or lower than the shutdown-mode start voltage value Vsd (S005).

If the measured battery voltage value V of the rechargeable battery 001 is higher than the shutdown-mode start voltage value Vsd (S005: NO), the battery voltage value V of the rechargeable battery 001 is measured again (S004). If it is determined that the measured battery voltage value V of the rechargeable battery 001 is equal to or lower than the shutdown-mode start voltage value Vsd (S005: YES), the mode is changed to the shutdown mode (S006).

After the mode is changed to the shutdown mode, the integration unit 018 of the battery pack 100 again measures the battery voltage value V of the rechargeable battery 001 so as to determine whether the battery voltage value V has reached the over-discharge-protection-mode start voltage value Vodp (S007). The integration unit 018 of the battery pack 100 determines whether the measured battery voltage value V of the rechargeable battery 001 is equal to or lower than the over-discharge-protection-mode start voltage value Vodp (S008).

If it is determined that the measured battery voltage value V of the rechargeable battery 001 is higher than the over-discharge-protection-mode start voltage value Vodp (S008: NO), the battery voltage value V of the rechargeable battery 001 is measured again (S007). If it is determined that the measured battery voltage value V of the rechargeable battery 001 is equal to or lower than the over-discharge-protection-mode start voltage value Vodp (S008: YES), the mode is changed to the over-discharge-protection mode (S009).

After the mode is changed to the over-discharge-protection mode, the integration unit 018 of the battery pack 100 measures the battery voltage value V of the rechargeable battery 001 so as to determine whether the battery voltage value V has reached the deep-discharge-mode start voltage value Vsuv (S010). The integration unit 018 of the battery pack 100 determines whether the measured battery voltage value V of the rechargeable battery 001 is equal to or lower than the deep-discharge-mode start voltage value Vsuv (S011).

If it is determined that the measured battery voltage value V of the rechargeable battery 001 is higher than the deep-discharge-mode start voltage value Vsuv (S011: NO), the battery voltage value V of the rechargeable battery 001 is measured again (S010). If it is determined that the measured battery voltage value V of the rechargeable battery 001 is equal to or lower than the deep-discharge-mode start voltage value Vsuv (S011: YES), the mode is changed to the deep-discharge mode (S011). The battery pack 100 may switch the modes in accordance with the set mode start voltage value by performing these steps.

Note that if the electronic device 200 is not shut down by the user, for example, if the battery voltage value V reaches the shutdown-mode start voltage value Vsd while the user is using the electronic device 200, or if the battery voltage value V reaches the shutdown-mode start voltage value Vsd due to natural discharge with the electronic device 200 being not started, the modes are switched by using initial values of the shutdown-mode start voltage value Vsd and the over-discharge-protection-mode start voltage value Vodp.

Figure 10:
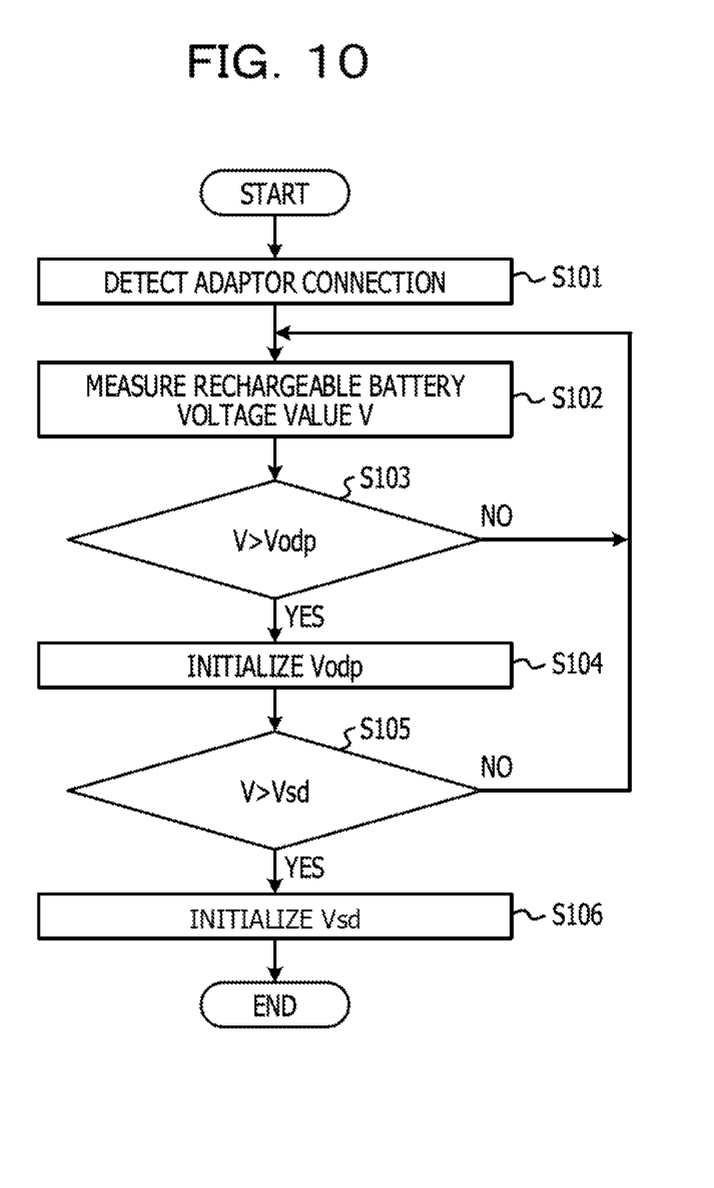
FIG. 10 illustrates a flow of resetting the start voltage values for the respective modes.

FIG. 10 illustrates a flow of resetting the start voltage values for the respective modes.

Upon connection of the adaptor for power supply, the input detector 021 of the battery pack 100 detects the connection of the adaptor (S101).

The integration unit 018 of the battery pack 100 measures the battery voltage value V of the rechargeable battery 001 to determine whether the battery voltage value V has reached a voltage value higher than the over-discharge-protection-mode start voltage value Vodp (S102). The integration unit 018 of the battery pack 100 determines whether the measured battery voltage value V of the rechargeable battery 001 is higher than the over-discharge-protection-mode start voltage value Vodp (S103). If it is determined that the measured battery voltage value V of the rechargeable battery 001 is equal to or lower than the over-discharge-protection-mode start voltage value Vodp (S103: NO), the battery voltage value V of the rechargeable battery 001 is measured again (S102). If it is determined that the measured battery voltage value V of the rechargeable battery 001 is higher than the over-discharge-protection-mode start voltage value Vodp (S103: YES), the over-discharge-protection-mode start voltage value Vodp set based on the shutdown voltage value Voff is reset to the initial value (S104). Consider a case where it is determined that the measured battery voltage value V of the rechargeable battery 001 is equal to or lower than the over-discharge-protection-mode start voltage value Vodp and where the battery voltage value V has been in the range for the shutdown mode. In this case, when the over-discharge-protection-mode start voltage value Vodp is reset to the initial value, the battery pack 100 operates in the shutdown mode, and the mode thus may immediately shift to the over-discharge-protection mode.

Subsequently, the integration unit 018 of the battery pack 100 determines whether the measured battery voltage value V of the rechargeable battery 001 is higher than the shutdown-mode start voltage value Vsd (S105). If it is determined that the measured battery voltage value V of the rechargeable battery 001 is equal to or lower than the shutdown-mode start voltage value Vsd (S105: NO), the battery voltage value V of the rechargeable battery 001 is measured again (S102). If it is determined that the measured battery voltage value V of the rechargeable battery 001 is higher than the shutdown-mode start voltage value Vsd (S105: YES), the over-discharge-protection-mode start voltage value Vodp set based on the shutdown voltage value Voff is reset to the initial value (S106).

As described above, the embodiment enables the period for the battery voltage to reach the deep discharge region to be prolonged in accordance with the usage by a user.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A battery pack comprising:
   a rechargeable battery;
   a first circuit configured to disable the rechargeable battery by prohibiting charging the rechargeable battery when an output voltage value of the rechargeable battery becomes equal to or lower than a first voltage threshold; and
   a second circuit configured to:
      stop power supply for an electronic device from the rechargeable battery when the output voltage value of the rechargeable battery becomes equal to or lower than a second voltage threshold that is higher than the first voltage threshold;
      detect that the power supply from the rechargeable battery is terminated;
      measure the output voltage value of the rechargeable battery when power supply from the rechargeable battery is terminated; and
      update the second voltage threshold by determining the second voltage threshold based on the measured output voltage value.

2. The battery pack according to claim 1,
   wherein the second voltage threshold is updated based on a remaining capacity of the rechargeable battery and consumed current of the second circuit.

3. The battery pack according to claim 2,
   wherein the second voltage threshold is updated based on a period, being estimated based on the remaining capacity of the rechargeable battery and the consumed current of the second circuit, during which the output voltage value of the rechargeable battery, which is observed when power supply from the rechargeable battery is terminated, keeps higher than the second voltage threshold.

4. The battery pack according to claim 3,
   wherein the second voltage threshold is updated to a new value when the estimated period is longer than a predetermined period.

5. The battery pack according to claim 4,
   wherein the new value is smaller than the second voltage threshold used for estimating the period and equal to or larger than a specified value for which the output voltage value of the rechargeable battery, which is observed when power supply from the rechargeable battery is terminated, keeps higher than the second voltage threshold during the predetermined period.

6. The battery pack according to claim 3,
   wherein the period is estimated further based on discharge characteristic of the rechargeable battery.

7. The battery pack according to claim 3,
   wherein first consumed current is higher than second consumed current, the first consumed current being consumed current of the second circuit when the output voltage value of the rechargeable battery is higher than the second voltage threshold, the second consumed current being consumed current of the second circuit when the output voltage value of the rechargeable battery, which is observed when power supply from the rechargeable battery is terminated, is equal to or lower than the second voltage threshold.

8. The battery pack according to claim 1,
   wherein charging of the rechargeable battery is allowed when the output voltage value of the rechargeable battery, which is observed when power supply from the rechargeable battery is terminated, becomes equal to or lower than the second voltage threshold.

9. The battery pack according to claim 1,
   wherein the second circuit is further configured to stop discharging of the rechargeable battery when the output voltage value of the rechargeable battery, which is observed when power supply from the rechargeable battery is terminated, becomes equal to or lower than a third voltage threshold that is between the first voltage threshold and the second voltage threshold.

10. The battery pack according to claim 9,
    wherein the third voltage threshold is updated based on the updated second voltage threshold.

11. The battery pack according to claim 3,
    wherein the second circuit is further configured to stop discharging of the rechargeable battery when the output voltage value of the rechargeable battery, which is observed when power supply from the rechargeable battery is terminated, becomes equal to or lower than a third voltage threshold that is between the first voltage threshold and the second voltage threshold,
    the third voltage threshold is updated based on the updated second voltage threshold, and
    first consumed current is higher than second consumed current, and the second consumed current is higher than third consumed current, the first consumed current being consumed current of the second circuit when the output voltage value of the rechargeable battery, which is observed when power supply from the rechargeable battery is terminated, is higher than the second voltage threshold, the second consumed current being consumed current of the second circuit when the output voltage value of the rechargeable battery, which is observed when power supply from the rechargeable battery is terminated, is equal to or lower than the second voltage threshold and higher than the third voltage threshold, the third consumed current being consumed current of the second circuit when the output voltage value of the rechargeable battery, which is observed when power supply from the rechargeable battery is terminated, is equal to or lower than the third voltage threshold.

12. A control circuit comprising:
    a memory circuit; and
    a processing circuit coupled to the memory circuit and configured to:
       stop power supply for an electronic device from a rechargeable battery when an output voltage value of the rechargeable battery becomes equal to or lower than a second voltage threshold that is higher than a first voltage threshold, the rechargeable battery being disabled by prohibiting charging the rechargeable battery when the output voltage value of the rechargeable battery becomes equal to or lower than the first voltage threshold;

detect that the power supply from the rechargeable battery is terminated;

measure the output voltage value of the rechargeable battery when power supply from the rechargeable battery is terminated; and update the second voltage threshold by determining the second voltage threshold based on the measured output voltage value.

13. An electronic device comprising:
a battery pack incorporated in the electronic device including:
a rechargeable battery,
a first circuit configured to disable the rechargeable battery by prohibiting charging the rechargeable battery when an output voltage value of the rechargeable battery becomes equal to or lower than a first voltage threshold, and a second circuit configured to:
stop power supply for the electronic device from the rechargeable battery when the output voltage value of the rechargeable battery becomes equal to or lower than a second voltage threshold that is higher than the first voltage threshold;

detect that the power supply from the rechargeable battery is terminated;

measure the output voltage value of the rechargeable battery when power supply from the rechargeable battery is terminated; and update the second voltage threshold by determining the second voltage threshold based on the measured output voltage value.

14. The battery pack according to claim 1, wherein
the second circuit is configured to detect that power supply from the rechargeable battery is terminated, by detecting shutdown of the electronic device.

* * * * *